US012252256B2

(12) United States Patent
Turnacilar et al.

(10) Patent No.: US 12,252,256 B2
(45) Date of Patent: Mar. 18, 2025

(54) DISCHARGE SYSTEM

(71) Applicant: TUSAS—TURK HAVACILIK VE UZAY SANAYII ANONIM SIRKETI, Kahramankazan/Ankara (TR)

(72) Inventors: Tarkan Turnacilar, Kahramankazan/Ankara (TR); Okan Erol, Kahramankazan/Ankara (TR); Halit Oruc, Kahramankazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 18/695,743

(22) PCT Filed: Sep. 20, 2022

(86) PCT No.: PCT/TR2022/051017
§ 371 (c)(1),
(2) Date: Mar. 26, 2024

(87) PCT Pub. No.: WO2023/055322
PCT Pub. Date: Apr. 6, 2023

(65) Prior Publication Data
US 2024/0391594 A1 Nov. 28, 2024

(30) Foreign Application Priority Data
Sep. 20, 2022 (TR) .................................. 2021/05265

(51) Int. Cl.
*B64D 15/10* (2006.01)

(52) U.S. Cl.
CPC .................................. *B64D 15/10* (2013.01)

(58) Field of Classification Search
CPC .............................. B64D 15/10; B64D 15/06
See application file for complete search history.

(56) References Cited

U.S. PATENT DOCUMENTS 5,904,321 A * 5/1999 Cox .......................... B64F 5/23
203/18
10,569,888 B2   2/2020 Lorenz

FOREIGN PATENT DOCUMENTS

CN    109878740 A  *  6/2019
CN    209776813 U  *  12/2019

OTHER PUBLICATIONS

International Search Report and Written Opinion for PCT application No. PCT/TR2022/051017, mailed Dec. 5, 2022.
(Continued)

*Primary Examiner* — Justin M Benedik
(74) *Attorney, Agent, or Firm* — NOTARO, MICHALOS & ZACCARIA P.C.

(57) ABSTRACT

A discharge system has a body is located on an air vehicle. At least one wing extends outward from the body and which comes into contact with the air to provide the lift force to the body. A first cover in a skirt form surrounds the wing. One end of the first cover is connected to the body and the other end thereof extends outward from the body so as to have a distance with the wing. An opening is located between the first cover and the wing for directing a fluid on the wing between the wing and the body. A discharge line is located on the body facing the opening that allows the fluid directed through the opening to be removed from the wing.

14 Claims, 4 Drawing Sheets

(56) References Cited

OTHER PUBLICATIONS

Demand for corresponding PCT application No. PCT/TR2022/051017, filed Jul. 21, 2023.
International Preliminary Report on Patentability for PCT application No. PCT/TR2022/051017, completed Aug. 31, 2023.

\* cited by examiner

DISCHARGE SYSTEM

The present invention relates to a discharge system developed for discharging liquids in an air vehicle from the air vehicle.

Snow and ice accumulation on components such as wings provided on air vehicles or unmanned aerial vehicles are a dangerous situation that adversely affects flight performance. Icing on aircraft structures prevents the aircraft from having a clean surface, disrupting the surface characteristics and causing additional weight, as well. In addition, control of the aircraft becomes difficult when the control surfaces are frozen. According to the current applications carried out within the scope of efforts to prevent icing and to eliminate the negative consequences thereof, liquid ice protection systems are used such that, when these systems are operated, some of the liquids flowing outside the air vehicle by clinging to the outer surface of the tail enter the air vehicle and discharged by drainage openings. In this case, various insulation measures and design changes are required to ensure that the liquid is collected in a controlled manner in areas where the liquids entering the air vehicle can damage all structures and electronic components, and studies are carried out in this regard. Moreover, efforts are made to provide systems that will allow undesired liquids to be collected in an external container in order to prevent them from entering the air vehicle.

U.S. Pat. No. 10,569,888, which is included in the known-state of the art, discloses a structure forming an outer surface of the aircraft, and a liquid-fed system used to prevent icing on the structure. There is also provided a heater used to heat the anti-icing liquid.

A discharge system according to the present invention provides a system that allows liquids, which are used on aircrafts or unmanned aerial vehicles to provide protection against rain or ice, to be discharged from air vehicles during a flight.

The discharge system realized to achieve the object of the present invention, which is defined in the first claim and the other claims dependent thereon, comprises a body provided on an aircraft or unmanned aerial vehicle; and at least one wing which extends out of the body, balances the weight of the body by contacting the air, and provides lift to the body.

The discharge system of the invention comprises a first cover in a skirt form surrounding the wing, wherein one end of the first cover is connected to the body, and the other end thereof extends outward from the body so as to have a distance with the wing; an opening between the first cover and the wing; a discharge line located on the body facing the opening and opposite the opening, allowing the fluid to be removed from the wing.

In an embodiment of the invention, the discharge system comprises the first cover with an outwardly widening curved funnel structure that allows the fluid to enter the opening more effectively.

In an embodiment of the invention, the discharge system comprises the first cover located on the body, which substantially surrounds a leading edge of the wing and extends along so as not to surround a trailing edge of the wing.

In an embodiment of the invention, the discharge system comprises the wing extending outward from the body so as to make an angle with the horizontal axis of the body.

In an embodiment of the invention, the discharge system comprises the wing which extends outward from the body to form a V form with the body.

In an embodiment of the invention, the discharge system comprises a second cover which is connected to the wing at one end and connected to the body at another end, so that it is reciprocal to the first cover, and which is form-compatible with the first cover; the discharge line which is located between the first cover and the second cover and removes the fluid on the wing from the wing through the opening.

In an embodiment of the invention, the discharge system comprises an attachment area in which the wing is attached to the body; a second cover which is attached to the wing at one end and to the body at another end on the attachment area.

In an embodiment of the invention, the discharge system comprises a control surface located on the leading edge of the wing so as to extend outward from the wing, wherein the control surface can be controlled by any actuator; a plurality of pores located on the control surface, which allow a fluid, such as an anti-icing fluid, to be transmitted to the wing.

In an embodiment of the invention, the discharge system comprises the first cover and the second cover, which at least partially enclose the wing and located opposite to each other so as to be form-compatible with the control surface.

In an embodiment of the invention, the discharge system comprises a transmission line which, in case of icing formed on the wing, provides fluid transmission to the wing, by the command given by the pilot, through the pores in order to prevent the wing from icing, wherein the transmission line allows transmission of the anti-icing fluid; a tank for storing the fluid, from which the transmission line obtains the fluid.

In an embodiment of the invention, the discharge system comprises a discharge line inlet located on the second cover, which allows the fluid discharged through the opening between the first cover and the second cover to be removed from the system.

In an embodiment of the invention, the discharge system comprises a transmission line with a pump, wherein the pump is located in the tank and creates the pressure required to transmit the fluid used to protect the wing from icing to the body through the pores on the control surface.

In an embodiment of the invention, the discharge system comprises a plurality of hoses in a flexible form, which are located on the discharge line and the transmission line.

In an embodiment of the invention, the discharge system comprises the first cover and/or the second cover made of a corrosion resistant and rigid material.

In an embodiment of the invention, the discharge system comprises a plurality of connectors which allow the first cover and the second cover to be attached to the body in a removable way on the attachment area.

A discharge system realized to achieve the object of the present invention is illustrated in the attached drawings, in which.

Figure 1:
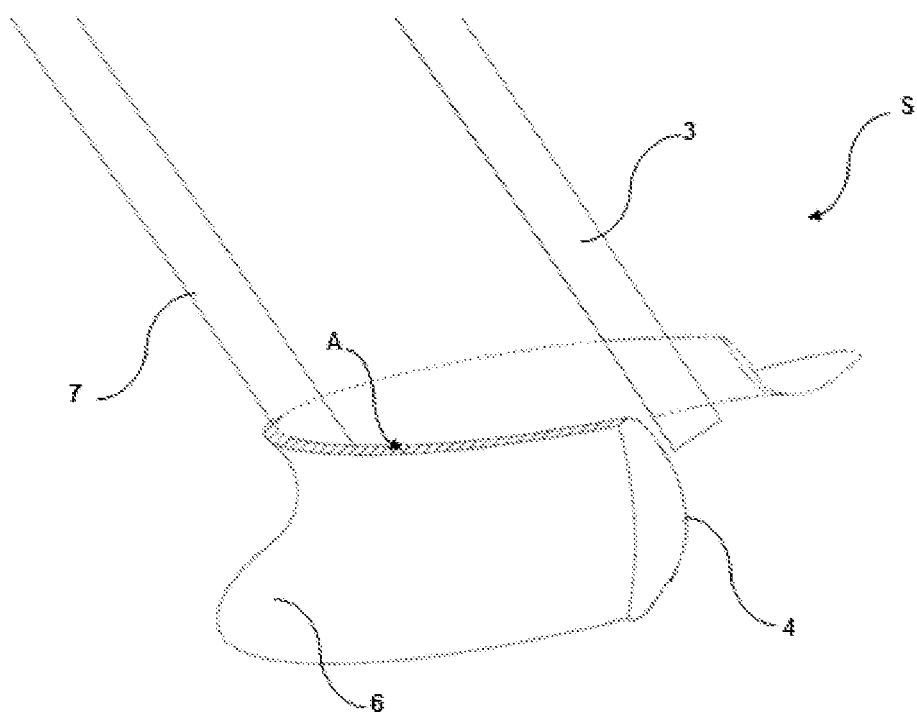
FIG. 1 is a schematic view of the attachment area.

All the parts illustrated in figures are individually assigned a reference numeral and the corresponding terms of these numbers are listed below:

1. Discharge system
2. Body
3. Wing
4. First cover
5. Discharge line
6. Second cover
7. Control surface
8. Pore 9. Transmission line
10. Tank
11. Discharge line inlet
12. Pump
13. Hose
   (A) Opening
   (F) Fluid
   (S) Attachment area The discharge system (1) comprises a body (2) which is located on the air vehicle; at least one wing (3) extending outward from the body (2), which comes into contact with the air to provide the lift force to the body (2).

Figure 2:
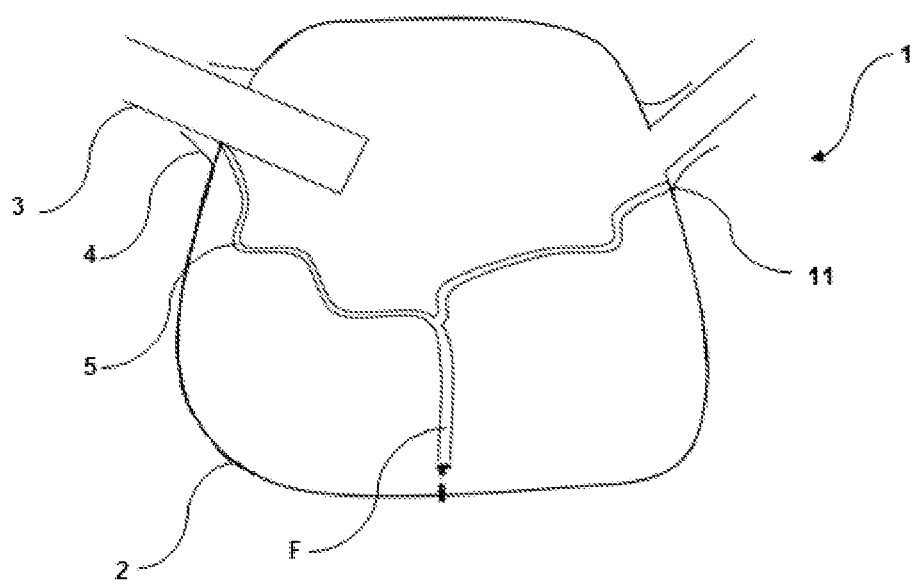
FIG. 2 is a schematic view of the discharge system.
Figure 3:
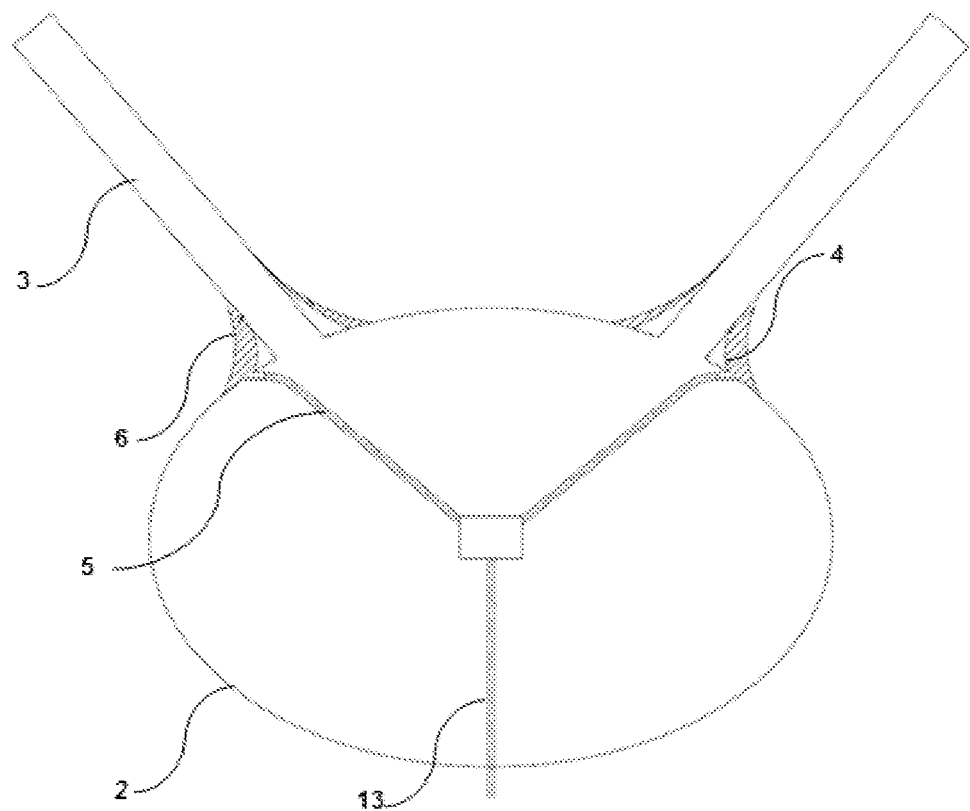
FIG. 3 is a schematic view of the first cover, the second cover and the discharge line.

The discharge system (1) according to the invention comprises a first cover (4) in a skirt form surrounding the wing (3), wherein one end of the first cover (4) is connected to the body (2), and the other end thereof extends outward from the body (2) so as to have a distance with the wing (3); an opening (A) which is located between the first cover (4) and the wing (3), thus directing the fluid (F) on the wing (3) between the wing (3) and the body (2); a discharge line (5) located on the body (2) facing the opening (A), allowing the fluid (D) directed through the opening (A) to be removed from the wing (3) (FIG. 1), (FIG. 2), (FIG. 3).

The wing (3), which is connected to the body (2) on the aircraft or unmanned aerial vehicle, comes into contact with the air and provides the lift force to the body (2).

Air vehicles are provided with an anti-icing fluid, though they are exposed to fluids (F) such as rain. There is provided a first cover (4) with a curved structure so as not to disturb the aerodynamic structure between the body (2) and the wing (3), wherein one end thereof is removably connected to the body (2) and extends to have a distance with the wing (3). An opening (A) is created between the first cover (4) and the wing (3). The fluids (F) on the air vehicle and the wings (3) are discharged through said opening (A) thanks to the flow of air during the flight. In this way, the fluids (A) accumulated on the wing (3) during the flight of the air vehicle can be discharged from the wing (3) more effectively through the discharge line (5). In addition, the first cover (4) is produced form-compatible with the connection between the body (2) and the wing (3), so that it does not create an extra drag force on the air vehicle.

In an embodiment of the invention, the discharge system (1) comprises the first cover (4) with an outwardly widening curved funnel structure to allow the fluid (F) to enter the opening (A) more effectively. The first cover (4) has a form that partially widens from the body (2) to remain opposite the wing (3), according to the discharge direction of the fluid (F) by means of the air flow, allowing the fluid (F) on the wing (3) to be removed more effectively. Therefore, the fluid (F) is discharged through the opening (A) by means of the air flow.

In an embodiment of the invention, the discharge system (1) comprises the first cover (4) located on the body (2), which almost extends up to the trailing edge of the wing (3) so as to substantially surround the leading edge of the wing (3). Therefore, an increase in the drag force on the air vehicle is prevented. Form of the first cover (4) is designed according to the distribution of the fluids (F) on the wing (3).

In an embodiment of the invention, the discharge system (1) comprises the wing (3) extending upwards from the body (2), outwardly from the body (2) at an angle with respect to the pitch axis of the body (2). The wing (3) extends to make an upward angle with the axis on which the body (2) performs the pitch motion. Thus, the fluid (F) is discharged from the wing (3) thanks to gravity and air flow.

In an embodiment of the invention, the discharge system (1) comprises the wing (3) which extends outwards to form a V form on the body (2). Therefore, the fluid (F) is discharged from the wing (3) thanks to gravity and air flow.

In an embodiment of the invention, the discharge system (1) comprises a second cover (6) which is almost conjugated with the first cover (4), wherein one end of the second cover (6) is connected to the wing (3) and the other end thereof is connected to the body (2); the first cover (4) which directs the fluid (F) on the wing (3) to the discharge line (5) by means of the opening (A) provided between the first cover (4) and the second cover (6). The fluids on the wing (3) are discharged through the opening (A) located between the first cover (4) and the second cover (6). The first cover (4) and the second cover (6) are removably attached to the body (2). In this way, they can be replaced by a new one by the manufacturer.

In an embodiment of the invention, the discharge system (1) comprises an attachment area (S) where the wing (3) is attached to the body (2); a second cover (6) which is located in the attachment area (S) so as to provide the aerodynamic form, wherein on end of the second cover (6) is attached to the body (2) and the other end thereof is attached to the wing (3) on the attachment area (S). The first cover (4) and the second cover (6) are located on the attachment area (S) of the wing (3) and the body (2). In this way, it does not disturb the structure of the air vehicle.

In an embodiment of the invention, the discharge system (1) comprises a control surface (7) which is located on the leading edge of the wing (3) so as to extend outward from the wing (3); a plurality of pores (8) which are located on the control surface (7) and allow the fluid (F) inside the body (2) to be transmitted to the wing (3). The fluid (F), such as an anti-icing liquid, is supplied to the wing (3) through a plurality of pores (8) located on a controlled control surface (7) provided on the leading edge of the wing (3). Thanks to the air flow, the fluid (F) moves towards the opening (A) located between the first cover (4) and the second cover (6). It is discharged from the air vehicle by means of the discharge line (5).

In an embodiment of the invention, the discharge system (1) comprises the first cover (4) and the second cover (6) which at least partially surround the wing (3) and located opposite to each other so as to be form-compatible with the control surface (7). In this way, the aerodynamic structure of the air vehicle is not disturbed.

Figure 4:
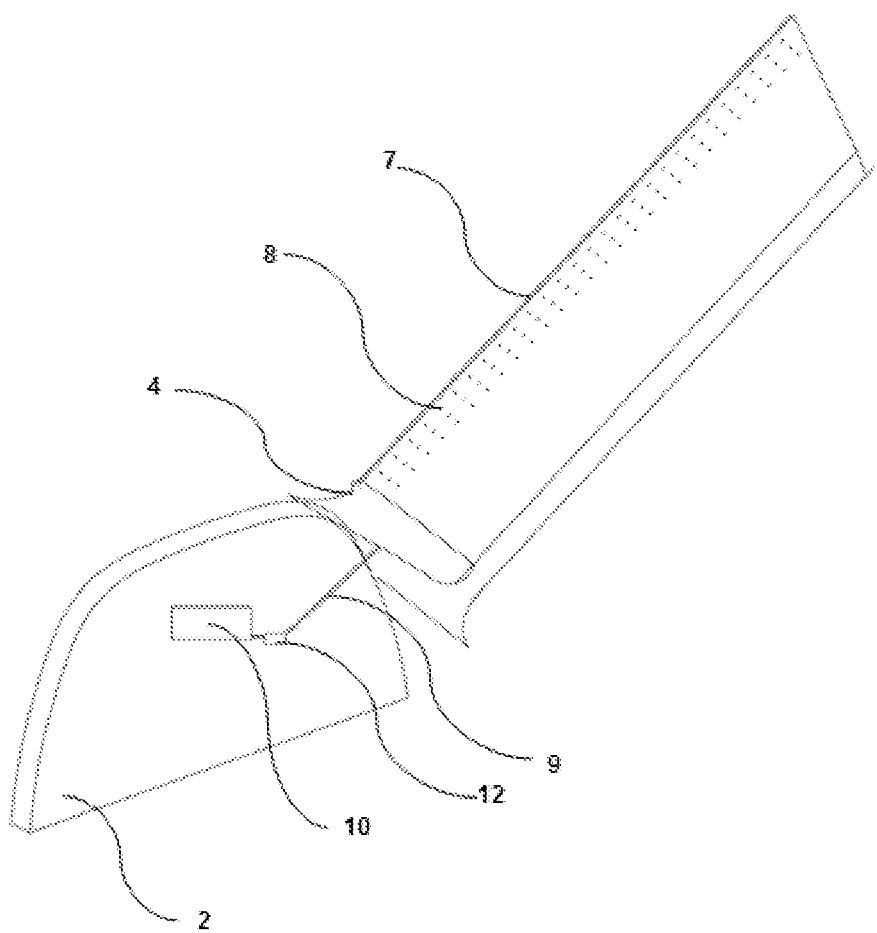
FIG. 4 is a schematic view of the control surface, pores, tank, pump and transmission line.

In an embodiment of the invention, the discharge system (1) comprises a transmission line (9) which enables the fluid (F) to be transmitted to the wing (3) through the pores (8) in order to prevent the wing (3) from icing; a tank (10) from which the transmission line (9) obtains the fluid (F). The fluid is located in the tank (10). The fluid (F), such as an anti-icing liquid, received from the tank (10) is transmitted to the wing (3) through the pores (8) via the transmission line (9) (FIG. 4).

In an embodiment of the invention, the discharge system (1) comprises a discharge line inlet (11) located on the second cover (6), which allows collection of the fluid (F) discharged through the opening (A) between the first cover (4) and the second cover (6). The fluid (F) on the wing (3) is discharged from the air vehicle through the opening (A) thanks to the air flow. The discharge line inlet (11) is located in the attachment area (S).

In an embodiment of the invention, the discharge system (1) comprises a transmission line (9) with a pump (12), wherein the pump (12) is located in the tank (10) and creates the pressure required to transmit the fluid (F) used to protect the wing (3) from icing to the body (2) through the pores (8) on the control surface (7). The pump (12) allows the required pressure to be created to transmit the fluid (F), such as an anti-icing liquid, through the pores (8) to the wing (3).

In an embodiment of the invention, the discharge system (1) comprises a plurality of hoses (13) in a flexible form, which are located on the discharge line (5) and the transmission line (9). The fluid (F) is transmitted from the tank (10) to the transmission line (9) by means of the hose (13).

In an embodiment of the invention, the discharge system (1) comprises the first cover (4) and the second cover (6), which are made of a material that is rigid enough not to deteriorate when exposed to air flow. The first cover (4) and the second cover (6) are made of a corrosion resistant and rigid material.

The invention claimed is:

1. A discharge system (1) comprising:
   a body (2) which is located on an air vehicle;
   at least one wing (3) extending outward from the body (2), which comes into contact with air to provide a lift force to the body (2);
   a first cover (4) in a skirt form surrounding the at least one wing (3), wherein a first end of the first cover (4) is connected to the body (2), and a second end of the first cover (4) extends outward from the body (2) so as to have a distance with the wing (3);
   an opening (A) which is located between the first cover (4) and the wing (3), thus directing a fluid (F) on the wing (3) between the wing (3) and the body (2); and
   a discharge line (5) located on the body (2) facing the opening (A), allowing the fluid (F) directed through the opening (A) to be removed from the wing (3).

2. The discharge system (1) according to claim 1, wherein the first cover (4) has an outwardly widening curved funnel structure to allow the fluid (F) to enter the opening (A).

3. The discharge system (1) according to claim 1, wherein the first cover (4) is located on the body (2) and which almost extends up to a trailing edge of the wing (3) so as to substantially surround a leading edge of the wing (3).

4. The discharge system (1) according to claim 1, wherein the wing (3) extends upwards from the body (2) and outwardly from the body (2) at an angle with respect to a pitch axis of the body (2).

5. The discharge system (1) according to claim 1, wherein the wing (3) extends outwards to form a V form on the body (2).

6. The discharge system (1) according to claim 1, comprising a second cover (6) which is almost conjugated with the first cover (4); wherein a first end of the second cover (6) is connected to the wing (3) and a second end thereof is connected to the body (2); and wherein the first cover (4) directs the fluid (F) on the wing (3) to the discharge line (5) by means of the opening (A) that is provided between the first cover (4) and the second cover (6).

7. The discharge system (1) according to claim 6, comprising an attachment area (S) where the wing (3) is attached to the body (2); wherein the second cover (6) is located in the attachment area (S) so as to provide an aerodynamic form; and wherein the second end of the second cover (6) is attached to the body (2) and the first end of the second cover (6) is attached to the wing (3) on the attachment area (S).

8. The discharge system (1) according to claim 6, comprising:
   a control surface (7) located on a leading edge of the wing (3) so as to extend outward from the wing (3); and
   a plurality of pores (8) which are located on the control surface (7) and allow the fluid (F) inside the body (2) to be transmitted to the wing (3).

9. The discharge system (1) according to claim 8, wherein the first cover (4) and the second cover (6) at least partially surround the wing (3) and are located opposite to each other so as to be form-compatible with the control surface (7).

10. The discharge system (1) according to claim 8, comprising:
    a transmission line (9) which enables the fluid (F) to be transmitted to the wing (3) through the pores (8) in order to prevent the wing (3) from icing; and
    a tank (10) from which the transmission line (9) obtains the fluid (F).

11. The discharge system (1) according to claim 6, comprising a discharge line inlet (11) located on the second cover (6) which allows collection of the fluid (F) discharged through the opening (A) between the first cover (4) and the second cover (6).

12. The discharge system (1) according to claim 10, comprising a transmission line (9) with a pump (12), wherein the pump (12) is located in the tank (10) and creates a pressure required to transmit the fluid (F) used to protect the wing (3) from icing to the body (2) through the pores (8) on the control surface (7).

13. The discharge system (1) according to claim 10, comprising a plurality of hoses (13) in a flexible form which are located on the discharge line (5) and the transmission line (9).

14. The discharge system (1) according to claim 6, wherein the first cover (4) and the second cover (6) which are made of a material that is rigid enough not to deteriorate when exposed to air flow.

* * * * *